United States Patent [19]

Haglund et al.

[11] Patent Number: 4,835,977
[45] Date of Patent: Jun. 6, 1989

[54] APPARATUS AND METHOD OF AIR-CONDITIONING PARKED AIRCRAFT

[75] Inventors: Richard A. Haglund, Hawthorne; Robert E. Tupack, Hermosa Beach, both of Calif.

[73] Assignee: Teledyne Industries, Inc., Los Angeles, Calif.

[21] Appl. No.: 183,459

[22] Filed: Apr. 14, 1988

Related U.S. Application Data

[63] Continuation of Ser. No. 91,546, Aug. 31, 1987, abandoned, which is a continuation of Ser. No. 889,091, Jul. 1, 1986, abandoned, which is a continuation of Ser. No. 753,705, Jul. 10, 1985, abandoned, which is a continuation of Ser. No. 553,439, Nov. 18, 1983, abandoned.

[51] Int. Cl.$^4$ ............................................. F25D 17/06
[52] U.S. Cl. ........................................ 62/89; 62/237; 62/278; 62/434
[58] Field of Search ................... 62/89, 237, 278, 434, 62/513

[56] References Cited

U.S. PATENT DOCUMENTS

| | | | |
|---|---|---|---|
| 2,494,785 | 1/1950 | Tramontini | 126/109 |
| 2,585,570 | 2/1952 | Messinger | 62/137 |
| 2,586,002 | 2/1952 | Carson | 62/136 |
| 2,694,537 | 11/1954 | Reichert | 62/237 |
| 2,718,766 | 9/1955 | Imperatore et al. | 62/434 |
| 2,979,916 | 4/1961 | Mason | 62/172 |
| 3,156,101 | 11/1964 | McGuffex | 62/434 |
| 3,218,819 | 11/1965 | Crotser | 62/278 |
| 3,399,545 | 9/1968 | Anderson et al. | 62/237 |
| 3,464,226 | 9/1969 | Kramer | 62/278 |
| 3,587,243 | 6/1971 | Keller et al. | 62/402 |
| 4,334,411 | 6/1982 | Payne | 62/86 |
| 4,352,273 | 10/1982 | Kinsell et al. | 62/87 |

FOREIGN PATENT DOCUMENTS

| | | |
|---|---|---|
| 1026985 | 5/1953 | France . |
| 1042686 | 11/1953 | France . |
| 261037 | 12/1942 | Switzerland . |
| 904252 | 8/1962 | United Kingdom . |
| 1385881 | 3/1975 | United Kingdom . |
| 2015723 | 9/1979 | United Kingdom . |
| 2026152 | 1/1980 | United Kingdom . |

OTHER PUBLICATIONS

Jane's Airport Equipment 1983-84, 2nd Edition, Edited by David R. Rider AMRAes.
Lear Siegler, Inc., Catalog for Satorn Electric Ground Support Air Conditioning Unit.
Air-A-Plane Corporation, Catalog Sheets for Motels 2425FD-2, 2425FD-3 and 2424FD-4 Air Conditioner Units.
Air-A-Plane Corporation, Catalog Sheets for Models 652D-2, 652D-3 and 652D-4, Air Conditioner Units.
Air-A-Plane Corporation, Catalog Sheets for Model GH$_2$E Air Conditoner Unit.

*Primary Examiner*—Ronald C. Capossela
*Attorney, Agent, or Firm*—Bright & Lorig

[57] ABSTRACT

A method and apparatus for air conditioning parked aircraft is disclosed in which air at a temperature below the freezing point of water is provided under pressure to the aircraft. The use of sub-freezing air enables a reduction in air flow rate over prior art systems. This results in less power consumption for cooling and pressurizing the air and also results in less cabin noise. Further, the air entering the cabin is very low in humidity, which enhances passenger comfort. Several cooling system mechanizations are presented which include provisions for automatic frost removal.

80 Claims, 2 Drawing Sheets

APPARATUS AND METHOD OF AIR-CONDITIONING PARKED AIRCRAFT

This application is a continuation of application Ser. No. 07/091,546, filed Aug. 31, 1987, which application is a continuation of U.S. patent application Ser. No. 06/889,091, filed July 1, 1986, which application is a continuation of U.S. patent application Ser. No. 06/753,705, filed July 10, 1985, which application is a continuation of U.S. patent application Ser. No. 06/553,439, filed Nov. 18, 1983 all of which are abandoned.

BACKGROUND OF THE INVENTION

This invention relates to aircraft air-conditioning systems and, more particularly, to apparatus and method of cooling the passenger cabins of parked aircraft.

A number of systems have been developed over the years to satisty the requirement of maintaining the temperature of the passenger cabin of modern day aircraft at a level comfortable to the passengers during the time aircraft is parked. In such aircraft, the high density of passengers, the interior lighting, the large number of windows, and the heavily insulated fuselage all contribute to raising the temperature of the cabin of the parked aircraft to uncomfortable levels. Accordingly, it has been found necessary to provide a cooling system to lower the aircraft cabin temperature, even when the aircraft is parked in locations with relatively cold outside ambient temperatures.

One type of prior art system for cooling the cabin of a parked aircraft utilizes an on-board auxiliary power unit which is generally a small, jet-fueled turbine. The turbine, which is operated when the aircraft is parked, is used to power the on-board cooling system. This same cooling system is powered by the main engines during flight.

Another type of prior art system for cooling the cabin of a park aircraft utilizes one or more on-board air cycle machines which are special-purpose heat pumps. These machines cool the cabin air when they are supplied with a source of high-pressure, high temperature air. During flight, the source of air is an on-board compressor driven by the main engines. When the aircraft is parked, a ground-based air compressor is connected to the airplane to drive the heat pumps. This connection is made using a hose which links the compressor to a heat pump connector provided on the outer surface of the aircraft fuselage.

Yet another type of system for cooling the cabin of a parked aircraft utilizes a ground-based air conditioner unit which provides cool air under pressure directly into the cabin air-conditioning duct system. This ground-based air conditioner, which may be fixed in location or portable, is connected to the parked airplane using a flexible hose. This hose links the air conditioner to a connector, provided on the exterior of the fuselage, which communicates directly with the cabin ducts. In this mechanization, there is no need to operate the on-board cooling system when the aircraft is parked.

Of the previously described types of cooling system, the ground-based air conditioner unit is generally recognized as being the most energy efficient. Typically, prior art ground-based air conditioner units require from one-fifth to one-tenth the energy of those systems employing on-board auxiliary power units, and from one-half to one-fourth the energy of those systems employing on-board air cycle machines.

Even though ground-based air conditioner systems are generally more efficient than many other types of cooling systems, they still require large amounts of power for their operation. For example, electrically operated air conditioner systems for large commercial jet aircraft may require in excess of three hundred and fifty kilowatts of power for their operation.

Further, prior art ground-based air conditioner systems typically employ very large and powerful blowers in order to generate sufficient air flow to maintain the desired cabin temperature. These blowers, some of which may be rated in excess of one hundred and fifty brake horsepower, generate substantial levels of noise adjacent the air conditioner unit. In addition, these large blowers cause the cool air to exit the cabin air ducts at sufficiently high velocities to produce noticeable cabin noise.

Yet another drawback to prior art ground-based air conditioner systems is the high moisture content of the cool air delivered to the cabin air ducts. This moisture increases cabin humidity, causing mist formation and contributing to passenger discomfort.

Accordingly, it is an object of the present invention to provide new and improved apparatus and methods for cooling the cabins of parked aircraft.

It is another object of the present invention to reduce the power consumption of ground-based aircraft air conditioning systems.

It is yet another object of the present invention to improve the cabin environment of parked aircraft by reducing the noise and humidity produced by the air conditioning system.

SUMMARY OF THE INVENTION

The foregoing and other objects of the invention are accomplished by providing a ground-based air conditioning system for parked aircraft which departs from conventional mechanizations of such air conditioning systems by supplying to the aircraft air which is cooled below the freezing point of water.

For air conditioning purposes, the prior art has for the most part rejected the use of air cooled below forty degrees Fahrenheit on the basis that such cold air results in an inefficient system and in user discomfort. However, in the present invention there are developed air conditioning configurations which cool the air entering the aircraft below forty degrees Fahrenheit (preferably below thirty-two degress Fahrenheit) to provide a system for cooling parked aircraft which consumes less power, produces less outside and cabin noise, and provides a drier and more comfortable cabin environment than prior art systems of comparable cooling capacity.

Several embodiments are described for providing air at sub-freezing temperatures while overcoming the problem of excess frost building on the cooling elements.

Other features objects, and advantages of the invention will become apparent from a reading of the specification taken in conjunction with the drawings, in which like reference numerals refer to like elements in the several views.

DESCRIPTION OF THE PREFERRED EMBODIMENT

Figure 1:
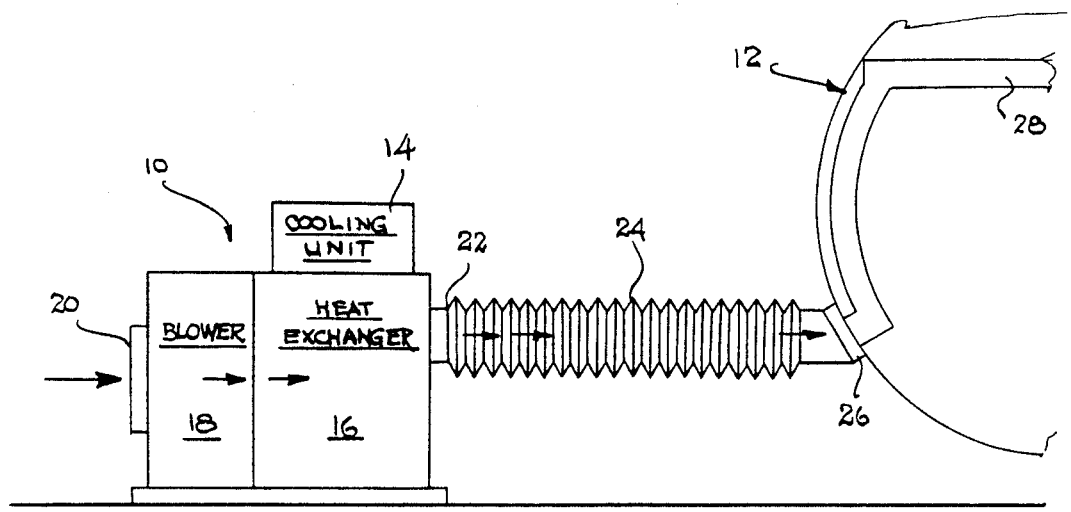
FIG. 1 is a block diagram of a ground-based air conditioning system of the type used in the present invention for cooling a parked aircraft.

Referring to FIG. 1, there is shown a block diagram of a ground-based air conditioning system 10 used to cool the cabin of a parked aircraft 12. The system 10 includes a cooling unit 14 which provides a source of cold fluid which is circulated through a heat exchanger 16. A blower 18 is used to force ambient air, entering through inlet 20, over the surfaces of the heat exchanger 16, whereby the air is cooled to the desired temperature when it exits from outlet 22. The heat exchanger 16 and the blower 18 are generally housed in a common enclosure which is located adjacent the airplane parking area. This enclosure may be fixed in location or may be portable. The cooling unit 14 may be located in that same area or may be remotely located as part of a central airport cooling system. In such instance, the cooling unit 14 is connected to the heat exchanger 16 using suitable piping. Electrical power to operate the blower 18 and the cooling unit 14 may be provided by a portable generator (typically driven by a diesel engine), or by the airport power utility using fixed power lines.

The air conditioning system air outlet 22 communicates with one end of a flexible hose 24. The other end of the hose 24 is attached to a connector 26 provided on the outside surface of the airplane 12. The connector 26, in turn, communicates with a network of air conditioning ducts 28 distributed throughout the passenger cabin of the aircraft 12.

In order to provide a comfortable enviroment in the passenger cabin of the parked aircraft, it is desirable to maintain cabin temperature at a nominal seventy-five degrees Fahrenheit, even under worst case conditions of maximum cabin heat load, commonly referred to as heat flow rate. Factors influencing this heat load are outside ambient temperature, sunlight radiating through the windows, interior cabin lights, and the number of passengers in the cabin For the most part, prior art air conditioning systems for parked aircraft accomplish the cooling task by providing air at the heat exchanger outlet 22 which has been cooled to between forty and fifty degrees Fahrenheit. Typically, the air flowing through the flexible hose 24 undergoes a temperature rise of about five degrss Fahrenheit. Accordingly, the temperature of the air entering the airplane at the connector 26 between forty-five and fifty-five degrees Fahrenheit in prior art systems. The blower 18 is sized to provide a sufficient rate of cool air flow to maintain the desired cabin temperature under conditions of maximum cabin heat load.

Until the present invention, those skilled in the art had for the most part rejected the concept of providing air at the heat exchanger outlet 22 which is colder than forty degrees Fahrenheit. These beliefs are based in part on the technical information accumulated over the years relating to the air conditioning of residential an commercial buildings.

Building air conditioning systems are characterized by the employment of very large air ducts having a low pressure drop. Air is cooled by cooling units to between forty and fifty-five degrees Fahrenheit and is distributed through the building duct system at very low flow rates. Generally, air pressure of only one to three inches of water is needed to distribute the cool air throughout the building. Accordingly, the power consumed by the blowers employed to move the air is quite small compared to the power needed to cool the air. Further, the very low air pressure used in these systems means that the blowers do not contribute significant heat to the air as the result of air compression.

In general, air cooling apparatus is less efficient when called upon to cool the air below forty degrees Fahrenheit. Further, air at these cold temperatures results in an uncomfortably chilly atmosphere in a building environment. It has also been found that air at these cold temperatures is sufficiently low in humidity that it causes an uncomfortably dry environment for the building occupants. Another factor to be considered is that the cooling of air below appoximately thirty-five degrees Fahrenheit requires the use of heat exchangers having subfreezing surfaces temperatures. These sub-freezing temperatures cause icing and frost buildup problems which do not occur in the prior art air-conditioning systems. Thus, the prior art has generally rejected the use of air cooled below forty degrees Fahrenheit in air conditioning systems, based on energy inefficiency, hardware mechanization problems, and on user discomfort.

In contrast to the prior art teachings, the present invention employs air temperatures below forty degrees Fahrenheit (preferably below the freezing point of water) in ground-based air conditioner systems for parked aircraft with a resultant decrease in power consumption and an increase in passenger comfort. This surprising result may be shown to te related to a combination of factors which are peculiar to aircraft air conditioning systems, as outlined below.

Due to space limitations, aircraft cabin air conditioning ducts are necessarily small in cross section. Further, the high passenger density in modern day aircraft, in conjunction with other heat producing factors previously mentioned, result in a heat load which requires a substantial rate of cooling air flow to maintain the desired cabin temperature. The combined requirement of high air flow rate and small duct cross-section results in the need for substantial air pressure to force the cool air into the cabin at the required flow rate. As shown in the following examples, the prior art cooling systems may be called upon to compress the cooling air to a pressure in excess of 34 inches of water in cooling a narrow-body jet aircraft, and in excess of 70 inches of water in cooling a wide-body jet aircraft.

The need for substantial air pressure is met in prior art systems by employing large and powerful blowers which consume a substantial portion of the overall energy consumed by the system. By way of example, in some prior art parked aircraft air conditioning systems, the blower consumes in excess of forty percent of the overall system power consumption. This is as opposed to building air conditioning systems where the blower represents only a few percent of the overall power consumption.

The need for large blowers to produce the required air flow rates further contributes to system inefficiency because these blowers add heat to the air. This heat, which must be removed by the cooling system, results from the compression of the air which occurs when it is pressurized.

In the present invention, it has been found that a reduction in the temperature of the air delivered to the airplane from that of prior art systems enables a reduction in the air flow rate necessary to maintain the desired cabin temperature. Such a temperature reduction (Typically, to a temperature level below the freezing point of water) does result in a reduction in the efficiency of operation of the cooling apparatus. However, the ability to reduce the air flow rate provides major system power savings because it both reduces the size of the blower and reduces the cooling requirements of the cooling apparatus. As demonstrated in the following examples, in the present invention the cooling air flow rate can be reduced such that the ratio between the cabin heat flow rate and units of BTUs per hour, and the cooling air flow rate, in units of pounds per minute is greater than 600, or in the other words greater than 10 BTU per pound of air, while this same ratio for prior art systems is typically less than 450. An overall power savings in excess of thirty percent is not uncommon for parked aircraft air conditioning systems built in accordance with the teachings of the present invention. The following examples are presented to more fully illustrate the features of the invention.

EXAMPLE I

This example compares the performance of prior art electrically operated ground-based air conditioner systems with a comparable system built in accordance with the teachings of the present invention when used to cool the cabin of a narrow body jet aircraft such as the Boeing Aircraft Co. Model 727-200.

Under the conditions of an outside ambient temperature of one hundred degrees Fahrenheit, bright sunlight, the interior cabin lights turned on, and 134 occupants on board, the cabin heat load or flow rate for the above model aircraft is approximately 85,940 BTU per hour. The goal of the air conditioning system is to maintain the cabin temperatures at seventy-five degrees Fahrenheit at this heat load.

Referring briefly to FIG. 1, prior art ground-based air conditioning systems generally provide air at no lower than forty degrees Fahrenheit at the outlet 22 of the heat exchanger. A typical five degree temperature rise in the hose 24 results in a minumum air temperature of forty-five degrees Fahrenheit at the airplane connector 26. Using the above figures, it may be shown that the cooling air flow rate required to achieve the desired cooling is about 200 pounds per minite. Comparing the cabin heat flow rate of 85,640 BTU per hour to the cooling air flow rate of 200 pounds per minutes, it will be seen that this prior art system requires a cooling air flow rate of about one pound per minute for every 430 BTUs per hour of cabin heat flow. At this cooling air flow rate, the blower 18 must develop air pressure of about thirty-four inches of water. Of this pressure, about five inches of water are attributable to the restriction in the heat exchanger 16 and related manifolds, about ten inches of water are attributable to the restriction imposed by the hose 24 and its related connections, and the remaining nineteen inches of water are attributable to the restrictions imposed by the cabin ducting 28.

Assuming a typical blower efficiency of sixty-two percent and a blower motor efficiency of ninety percent, it may be shown that a blower rated at twenty-three brake horsepower is required to provid the necessary air pressure. A blower of this size consumes about 19.2 kilowatts of electric power. Note that the ratio of the cabin heat flow rate of 85,940 BTU per hour to the blower power consumption of 19.2 kilowatts is about 4476 for this prior art system. It may also be shown that the cooling unit 14 must be sized to provide cooling at the rate of 327,600 BTU per hour (about 27.3 tons) in order to process 200 pounds per minute of air and achieve the necessary temperature reduction to forty degrees Fahrenheit at the heat exchanger outlet 22. Further, the cooling unit 14 must also remove the heat contributed by the blower 18 in compressing the air.

The twenty-three brake horsepower blower contributes heat at the rate of about 58,512 BTU per hour (4.9 tons). Accordingly, the cooling unit 14 must be sized to supply a total of 32.2 tons of cooling. A typical cooling unit 14 might employ direct expansion type refrigeration appartus. A well designed electrically operated air cooled refrigeration unit of this type which is configured to cool air to forty degress Fahrenheit may be expected to consume about 1.6 kilowatts per ton of cooling capacity. Accordingly, the prior art cooling unit described above would consume about 51.5 kilowatts which, when combined with the blower power consumption, yields a total priot art system power consumption of 70.7 kilowatts. Comparing the blower power consumption of 19.2 kilowatts to the cooling unit power consumption of 51.5 kilowatts, it will be seen that the blower consumption is about 37% of the cooling unit power consumption in this prior art system.

We return now to a system configured in accordance with the teachings of the present invention to provide the same cabin temperature of seventy five degress Fahrenheit under the same heat load of 85,940 BTU per hour. The present system is designed to provid air at the heat exchanger outlet 22 at a temperature of twenty-five degrees Fahrenheit, which is well below the freezing point of water (thirty-two degrees Fahrenheit). Allowing for a five degree Fahrenheit rise in to hose 24, the air temperature at the connector 26 is thirty degrees Fahrenheit.

Using the above figures, it may be shown that the cooling air flow rate requirement to achieve the desired cooling is only 133 pounds per minute, which is 33.5 percent less than the comparable prior art system air flow rate. Comparing the cabin heat flow rate of 85,940 BTU per hour to the cooling air flow rate of 133 pounds per minute, it may be seen that in this new system, a cooling air flow rate of about one pound per minute for every 646 BTUs per hour of cabin heat flow, is achieved. At this lower flow rate, the blower 18 need only develop air pressure of about thirteen inches of water. Of this pressure, about three inches of water are attributable to the restriction in the heat exchanger 16 and related manifolds, about five inches of water are attributable to the restriction imposed by the hose 24 and its related connections, and the remaining five inches of water are attributable to the restrictions imposed by the cabin ducting 28.

Assuming the same blower efficiencies as in the prior art system description above, it may be shown that the blower in the present system need only be rated at 5.9 brake horsepower. Such a blower typically consumes 4.9 kilowatts of power, which is about 25 percent of the power consumed by the blower in the prior art system. Also note that the ratio of the cabin heat flow rate of 85,940 BTU per hour to the blower power consumption of 4.9 kilowatts is about 17,539 for this system.

The reduced air flow rate results in a reduction in the cooling requirements of the cooling unit 14 to 268,128 BTU per hour (about 22.3 tons). The additional heat contributed by the smaller blower is only 15,010 BTU per hour (1.3 tons). Accordingly, the cooling unit 14 in the present system need only be sized to supply 23.6 tons of cooling, which is about twenty-seven percent less than the cooling requirement for the prior art system.

As explained earlier, cooling units such as the direct expansion type refrigeration unit are less energy efficiency when designed to provide cooling below about forty degrees Fahrenheit, which is the case for the present system. Such a cooling unit may be expected to consume on the order of 1.85 kilowatts per ton of cooling capacity, which is about sixteen percent less efficient than the prior art cooling unit. Accordingly, the sub-freezing cooling unit would consume about 43.7 kilowatts which, when combined with the blower power consumption yields a total system power consumption of 48.6 kilowatts.

Comparing the total power consumption figures for the two previously described systems, it will be appreciated that, in spite of the less efficiency cooling unit, the system of the present invention consumes 22.1 kilowatts less than comparable prior art systems, resulting in a power savings of over 31 percent.

EXAMPLE II

This second example compares the performance of prior art electrically operated ground-based air conditioner systems with a comparable system build in accordance with the teachings of the present invention when used to cool the cabin of a wide body jet aircraft such as the Boeing Aircraft Co. Model 747-200.

Under the conditions of an outside ambient temperature of one hundred degrees Fahrenheit, bright sunlight, the interior cabin lights turned on, and 511 occupants on board, the cabin heat load or flow rate for the above model aircraft is approximately 305,305 BTU per hour. The goal of the air conditioning system is to maintain the cabin temperature at seventy-five degrees Fahrenheit at this heat load.

The prior art ground-based air conditioning system provides air at forty degrees Fahrenheit at the outlet 22 of the heat exchanger. A typical five degree temperature rise in the hose 24 results in an air temperature of forty-five degrees Fahrenheit at the airplane connector 26. Using the above figures, it may be shown that the cooling air flow rate required to achieve the desired cooling is about 706 pounds per minute. Comparing the cabin heat flow rate of 303,305 BTU per hour to the cooling air flow rate of 706 pounds per minute, it will be seen that this prior art system requires a cooling air flow rate of about one pound per minute for every 432 BTUs per hour of cabin heat flow. At this cooling air flow rate, the blower 18 must develop air pressure of about seventy-three inches of water. Of this pressure, about five inches of water are attributable to the restriction in the heat exchanger 16 and related manifolds, about fifteeen inches of water are attributable to the restriction imposed by the hose 24 and its related connections, and the remaining fifty-three inches of water are attributable to the restriction imposed by the cabin ducting 28.

Assuming a typical blower efficiency of sixty percent and a blower motor efficiency of ninety percent, it may be shown that a blower rated at one hundred and eighty brake horsepower is required to provided the necessary air pressure. A blower of this size consumes about one hundred and fifty kilowatts of electric power. Note that the ratio of the cabin heat flow rate of 305,305 BTU per hour to the blower power comsumption of 150 kilowatts is about 2035 for this prior art system. The cooling unit 14 must be sized to provide cooling at the rate of 1,156,428 BTU per hour (about 96.4 ton) in order to process 706 pounds per minute of air and achieve the necessary temperature of forty degrees Fahrenheit at the heat exchanger outlet 22. Further, the cooling unit 14 must also remove the heat contributed by the blower 18 in compressing the air.

The one hundred and eighty brake horsepawer blower contributes heat a the rate of about 457,920 BTU per hour (38.2 tons). Accordingly, the cooling unit must be sized to supply a total of 134.6 tons of cooling. As described in the previous example, a direct expansion refrigeration unit configured to cool air to forty degrees Fahrenheit may be expected to consume on the of order of 1.6 kilowatts per ton of cooling capacity. Accordingly, the prior art cooling unit described above would consume about 215.4 kilowatts which, when combined with the blower power comsumption, yields a total prior art system power consumption of 365.4 kilowatts. Comparing the blower power consumption of 150 kilowatts to the cooling unit power consumption of 215.4 kilowatts, it will be seen that the blower power consumption is about 70% of the cooling unit power consumption in this prior art system.

We turn now to a system configured in accordance with the teachings of the present invention to provide the same cabin temperature of seventy-five degrees Fahrenheit under the same heat load of 305,305 BTU per hour. The present system is designed to provide air at the heat exchanger outlet 22 at a temperature of twenty-five degrees Fahrenheit. Allowing for a five degree Fahrenheit rise in the hose 24, the air temperature at the connector 26 is thirty degrees Fahrenheit.

Using the above figures, it may be shown that the air flow rate requirement to achieve the desired cooling is only 471 pounds per minute, which is 33.3 percent less than the comparable prior art system air flow rate. Comparing the cabin heat flow 305,305 BTUs per hour to the cooling air flow rate of 471 pounds per minute, it will be seen that in this new system, a cooling air flow rate of about one pound per minute for every 648 BTUs per hour of cabin heat flow is achieved. At this lower flow rate, the blower 18 need only develop air pressure of about forty-six inches of water. Of this pressure, about four inches of water are attributable to the restriction in the heat exchanger 16 and related manifolds, about ten inches of water are attributable to the restriction imposed by the hose 24 and its related connections, and the remaining thirty-two inches of water are attributable to the restriction imposed by the cabin ducting 28.

Assuming the same blower efficiencies as in the prior art system described above, it may be shown that the blower in the present system need only be rated at 75 brake horsepower. Such a blower typically consumes 62.5 kilowatts of power, which is about 42 percent of the power consumed by the blower in the prior art system. Also note that the ratio of the cabin heat flow rate of 305,305 BTU per hour to the blower power consumption of 62.5 kilowatts is about 4885 for this system.

The reduced air flow rate results in a reduction in the cooling requirements of the cooling unit 14 to 949,536 BTU per hour (about 79.1 tons). The additional heat contributed by the smallar blower is only 190,800 BTU per hour (15.9 tons). Accordingly, the cooling unit 14 in the present system need only be sized to supply 95 tons of cooling, which is about twenty-nine percent less than the cooling requirement for the prior art system.

Using the energy consumption factor of 1.85 kilowatts per ton of cooling capacity established earlier, this sub-freezing cooling unit would consume about 175.8 kilowatts which, when combined with the blower power consumption, yields a total system power consumption of 238.3 kilowatts.

Comparing the total power consumption figures for the two previously described systems for wide-body aircraft, it will be appreciated that in spite of the less efficient cooling unit, the system of the present invention consumes 127.1 kilowatts less than comparable prior art systems, resulting in a power savings of about thirty-five percent.

In addition to power savings, air conditioning systems constructed in accordance with the teachings of the present invention offer other advantages over prior art systems. For example, the air cooled to forty-five degrees Fahrenheit at the aircraft connector in prior art system is generally extremely high in moisture content, resulting in a relative humidity in the aircraft cabin in the range of 70 to 80 percent, which is considered uncomfortable. On the other hand, in the present invention, by cooling the air to sub-freezing temperatures, a great deal of moisture is removed by condensation. Accordingly, the air entering the cabin is much lower in humidity than in prior art systems and a cabin relative humidity of less than fifty percent may be expected.

It will be appreciated that the air entering the cabin in the present system is colder than that of prior art systems. From the prior art teachings related to building air conditioning, one might expect passenger discomfort at these lower temperatures. One the contrary, it has been found that the high cabin heat load, the high density of passengers, the relatively short time during which the airplane is parked with passengers aboard, and the rapid mixing of air due to its relatively high duct exit velocity, all contribute to obviate passenger discomfort.

It is interesting to note that the low humidity of the cabin air produced using the present invention could enable the cabin temperature to be increased several degrees above the commonly selected seventy-five degrees Fahrenheit, while maintaining the same or greater level of passenger perceived comfort. It is well known to those skilled in the art that such perceived comfort is a function both of temperature and humidity.

Another feature of the present invention is the reduction of cabin noise. Using the present invention, air is delivered into the cabin at a flow rate which is about thirty-three percent less than that of prior art systems. This reduced air flow rate decreased wind noise to less half that of prior art systems. Noise produced outside the airplane in the vicinity of the blower 18 is also reduced by practicing the present invention. The use of smaller, less powerful blowers results in blower noise which is about six to ten decibels less than that of prior art systems.

Installation and operating costs of systems constructed in accordance with the teachings of the present invention are greatly reduced over these same costs for prior art systems. For example, the reduction in system electrical power enables a reduction in airport wiring costs for fixed installation ground-systems. Since an air conditioning system is generally provided at each gate in an airport, this installation savings is significant.

Figure 2:
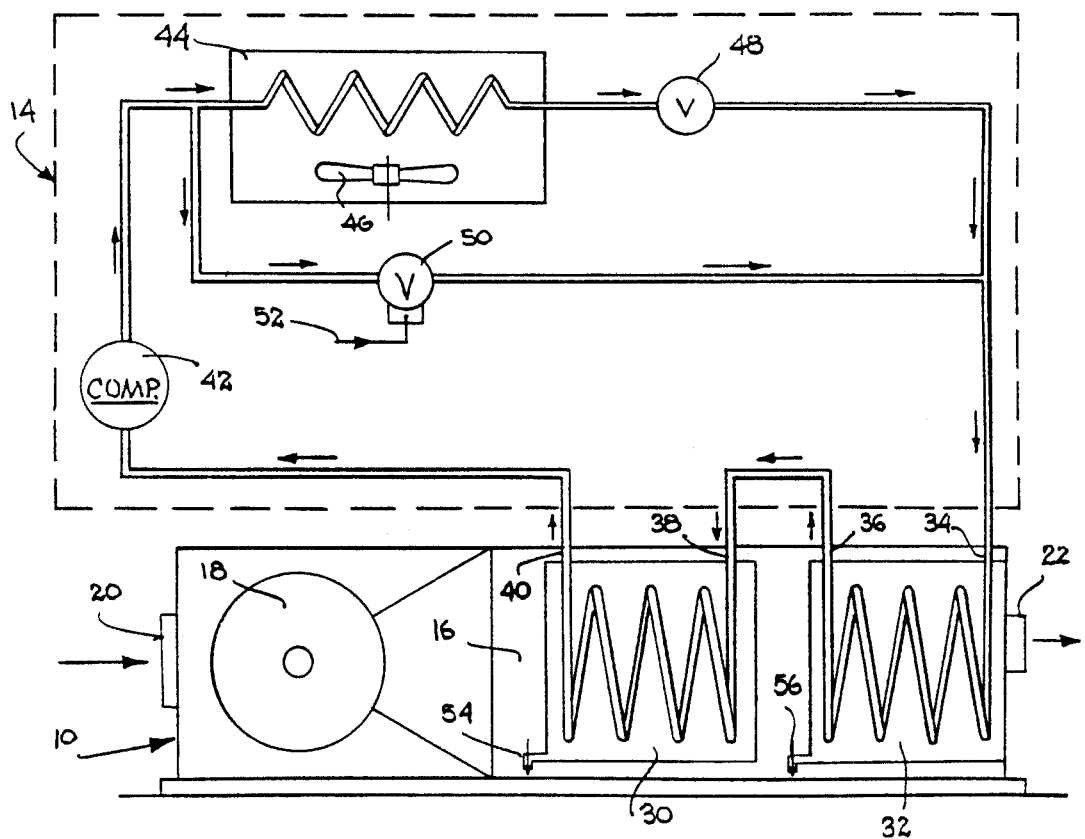
FIG. 2 is a schematic diagram of a direct expansion type of cooling configuration which may be used in the air conditioning system of FIG. 1 to practice the present invention.
Figure 3:
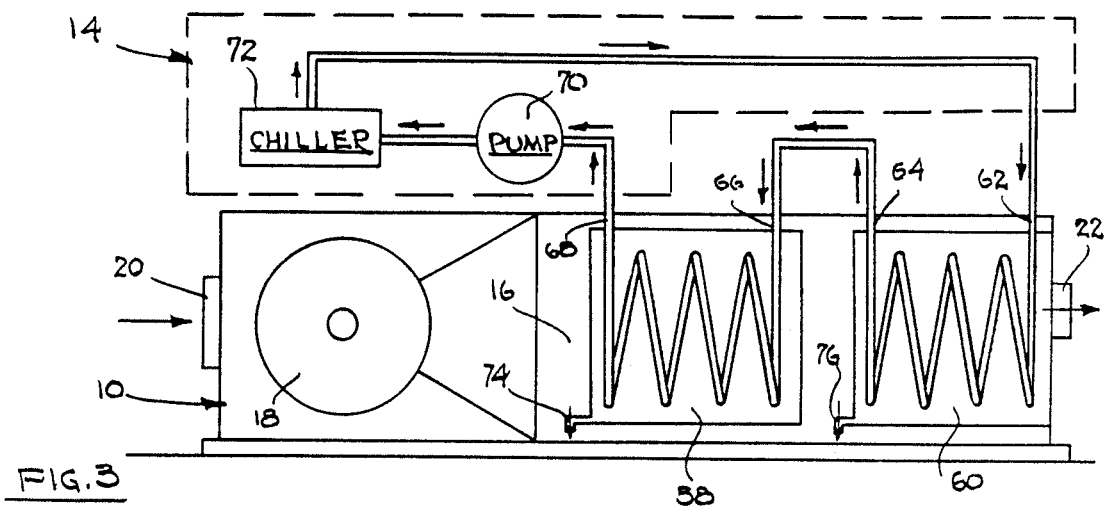
FIG. 3 is a schematic diagram of a chilled liquid type of cooling configuration which may be used in the air conditioning system of FIG. 1 to practice the present invention.
Figure 4:
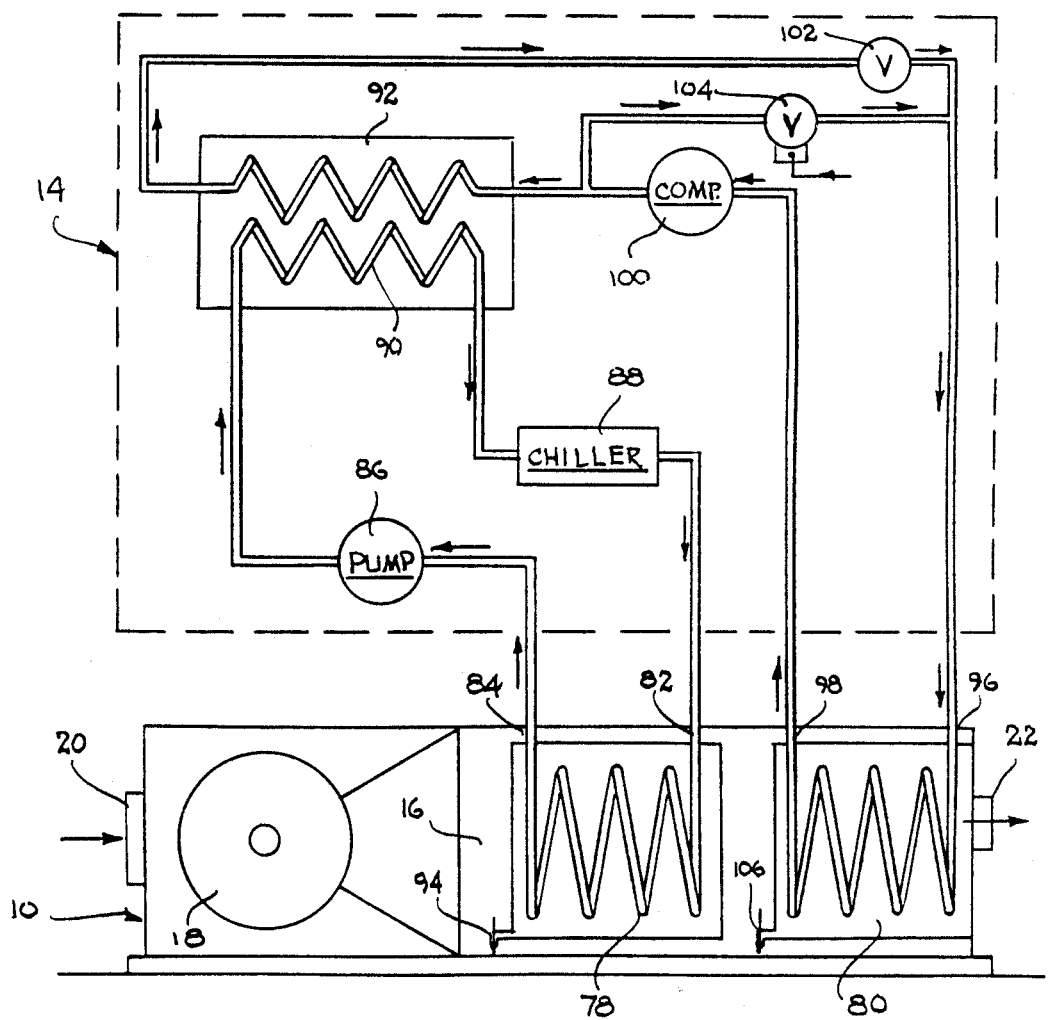
FIG. 4 is a schematic diagram of a combination chilled liquid and direct expansion type of cooling configuration which may be used in the air conditioning system of FIG. 1 to practice the present invention.

Returning to FIG. 1, the cooling of air to sub-freezing temperatures in the present invention presents the problem of frost buildup on the surfaces of the heat exchanger 16. It will be appreciated that to achieve the low air temperatures used in the present invention, it is necessary to cool at least some portion of the surfaces of the heat exchanger 16 belowe the freezing point of water. The buildup of frost on these surfaces is the result of the freezing of moisture which has been condensed from the air. Excess frost accumulation can block the heat exchanger air flow passages and reduce system cooling efficiency. FIGS. 2 through 4 show various air conditioning configurations which have been developed as part of the present invention to overcome the frost problem.

FIG. 2 is a schematic diagram of a ground-based air conditioning system 10 employing a direct expansion type cooling unit 14. The heat exchanger 16 includes first and second sections 30 and 32, respectively, which are typically formed of coiled copper tubing. The section 30 is positioned closest the blower 18, while the section 32 is positioned adjacent the heat exchanger outlet 22. The sections 30 and 32 are interconnected so that a compressible fluid refrigerant, such as Freon, may flow through the section 32 from an inlet 34 to an outlet 36 and then through section 30 from an inlet 38 to an outlet 40. It will be appreciated that the flow of fluid is from a location closest the outlet 22 to a location closest the blower 18 in the heat exchanger 16. This flow pattern establishes a temperature gradient in the heat exchanger 16 whereby the air flowing from the blower 18 to the outlet 22 in made progressively colder.

The outlet 40 is connected to an inlet of a compressor 42 used to compress the fluid. An outlet of the compressor 42 is connected to an inlet of a condenser 44 which may be air cooled by a fan 46 in order to liquify the compressed fluid. An outlet of condenser 44 is connected to an inlet of an expansion valve 48, the outlet of which is connected to the inlet 34 of the section 32. The expansion valve 48 is used to cause the fluid to expand and evaporate in this coils of the sections 30 and 32, thus lowering the temperature of the heat exchanger surfaces. An electrically operated bypass valve 50 is connected between the outlet of the compressor 42 and the inlet 34 of the heat exchanger section 32. The normally open valve 50 is closed in response to an electrical signal applied on line 52.

The sections 30 and 32 are sized so that when the blower 18 forces ambient air over these sections, the section 30 reduces the temperature of the air until it is only a few degrees above freezing. At this temperature, a large percentage of the moisture in the air is removed without any freezing of this moisture occurring on the surfaces of the section 30. The condensed moisture which drips from the surfaces of the section 30 is removed from the exchanger 16 using a suitable drain 54. The chilled air then passes over the surfaces of the second section 32 where it is cooled to the desired sub-freezing temperature. Because most of the moisture has already been removed by section 30 (only about 0.004 pounds of moisture remain per pound of dry air), the rate of ice formation on the surfaces of section 32 is relatively slow.

The ice which does form on the surfaces of the section 32 is periodically removed by opening the bypass valve 50. Opening this valve 50 causes hot refrigerant gas (at approximately 150 to 200 degrees Fahrenheit) from the compressor 42 to enter the section 32 tubing and rapidly melt the ice. The melted ice is drained away using drain 56. The valve 50 may be operated on a periodic basis by an electrical timer to automatically defrost the section 32. It has been found that operation of the valve 50 for about two minutes every twenty minutes is adequate to prevent excess frost buildup.

During this short defrost cycle, the temperature of the air exiting the exchanger 16 will rise to about sixty degrees Fahrenheit. However, the large thermal mass provided by the hose 24 and the duct system 28 acts to maintain the temperature of the air entering the cabin at very nearly the desired temperature during this time. Accordingly, the defrost cycle has negligible effect on the overall cabin temperature.

FIG. 3 is a schematic diagram of a ground-based air conditioning system employing a chilled liquid type cooling unit 14. The heat exchanger 16 includes first and second section 58 and 60, respectively, which are typically formed of copper tubing. The section 58 is positioned closest the blower 18, while the section 60 is positioned adjacent the heat exchanger outlet 22. The sections 58 and 60 are interconnected so that a liquid having a freezing point below that of water may flow through the section 60 from an inlet 62 to an outlet 64 and then through section 58 from an inlet 66 to an outlet 68. It will be appreciated that the flow of liquid (which may be a mixture of glycol and water) is from a location closest the outlet 22 to a location closest the blower 18 in the heat exchanger 16.

The outlet 68 is connected to an inlet of a pump 70 used to pump the liquid through the heat exchanger. An outlet of the pump 70 is connected to an inlet of a chiller 72, and an outlet of the chiller is connected to the inlet 62 of the section 63. The chiller 72 may be any one of a number of apparatus configurations which is able to cool the liquid to a temperature below the freezing point of water (for example, to twenty degrees Fahrenheit).

The sections 58 and 60 are sized so that when the blower 18 forces ambient air over these sections, the section 58 reduces the temperature of the air until it is only a few degrees above freezing. As in the previously described configuration, a large percentage of moisture is removed without any frost occurring on the surfaces of the section 58. Condensed moisture drains via drain 74. The chilled air passes from the section 58 to the section 60, where it is cooled to the desired sub-freezing temperature, and the air then exits through the outlet 22. The rate of ice formation on the surfaces of the section 60 is relatively slow, because most of the moisture in the air has already been removed in the section 58. It should be noted that the flow of chilled liquid through the heat exchanger 16 from the outlet 22 toward the blower 18 aids in establishing the section 60 as the coldest of the two sections and provides the desired cooling gradient.

The frost which does form on the surfaces of the section 60 is periodically removed by stopping the pump 70, which stops the flow of cold liquid through the heat exchanger 16. The warm ambient air being drawn in by the blower 18 and forced over the heat exchanger surfaces acts to quickly defrost the section 60. Condensed moisture drains from the section 60 via drain 76. It has been found that by stopping the pump 70 for two minutes every twenty minutes, the section 60 is adequately defrosted. As in the previous system description, the short defrost interval does not produce any significant increase in airplane cabin temperature because of the large thermal mass of the hose 24 and duct system 28.

FIG. 4 is a block diagram of a ground-based air conditioning system employing both chilled liquid and direct expansion cooling. The heat exchanger 16 includes first and second sections 78 and 80, respectively, which may be formed of copper tubing or the like. The section 78 is positioned closest the blower 18, and includes an inlet 82 and outlet 84.

The section 78 is connected as part of a chilled liquid system comprising a pump 86 and a chiller 88. The pump 86 circulates a liquid, which may be water, through the chiller 88 and through the section 78 from the inlet 82 to the outlet 84. Connected between the pump 86 and the chiller 88 is a heat exchanger coil 90 which is part of a condenser 92 further described below.

The section 78 is designed to cool the incoming ambient air to a temperature slightly above the freezing point of water. Accordingly, the liquid flowing through the section 78 need not be chilled below the freezing point of water. In fact, the chiller 88 may be part of a central airport cooling system for generating cold water, and a portion of this water can be routed to flow through the section 78. Condensed moisture collecting on the surfaces of this section is drained via drain 94.

The section 80 is designed to cool the alraedy chilled air from the sesction 78 to the sub-freezing temperature desired at the outlet 22. The section 80 is connected as part of a direct expansion refrigeration system similar in operation to that described above for the mechanization shown in FIG. 2.

A compressible fluid refrigerant, such as Freon, flows through the section 80 from an inlet 96 to an outlet 98. The outlet 98 is connected to an inlet of a compressor 100 designed to compress the fluid. An outlet of the compressor 100 is connected to an inlet of the condenser 92 which is designed to condense the fluid to a liquid. The heat exchanger 90, which is connected as part of the chilled water system described above, provides cooling for the condenser 92 in lieu of air cooling. An outlet of the condenser 92 is connected to an inlet of an expansion valve 102, and an outlet of the expansion valve 102 is connected to the inlet 96 of the section 80. The expansion valve 102 causes the fluid to expand and evaporate in the coils of the section 80, thus lowering the temperature of the heat exchanger surfaces to achieve the desired air temperature.

An electrically operated bypass valve 104 is connected between the outlet of the compressor 100 and the inlet 96 of the section 80. The valve 104 is operated periodically to provide hot compressed fluid to the section 80 in order to defrost the surfaces of this section. As in the previous mechanizations, a two minute defrost interval every twenty minutes has been found to be adequate. Melted ice is drained from the section 80 using drain 106.

While there have been shown and described preferred embodiments of the invention, it is to be understood that various other adaptations and modification may be made within the spirit and scope of the inven-

What is claimed is:

1. A method of maintaining, for a prescribed cabin heat flow rate, the temperature in the interior of the passenger cabin of a parked aircraft at approximately 75° F., where the aircraft has an external air inlet for the introduction of cooling air into ductwork communicating with the cabin, the method comprising the steps of:

reducing the temperature of a portion of the ambient air external to the aircraft to a first level of temperature which is at least 5° F. below the freezing point of water, using electrically-powered vapor-compression cycle cooling apparatus located external to the airplane; and providing to the aircraft external air inlet at a second level of temperature which is below the freezing point of water the air cooled by the cooling apparatus at a cooling air flow rate established by an electric motor driven blower whose power requirement is more than 10 percent of the power required by the cooling apparatus and which compresses the air cooled by the cooling apparatus to a pressuure of at least 13 inches of water, where the cooling air flow rate is such that the ratio of the cabin heat flow rate, in units of BTUs per hour, to the cooling air flow rate, in units of pounds per mintue, is greater than 600.

2. The method of claim 1 in which the step of reducing the temperature of the portion of the ambient air sufficiently to lower the second level of temperature below the freezing point of water includes the steps of:

providing a heat exchanger having first and second sections of coiled tubing;

circulating a fluid through the second and first sections, respectively, of the heat exchanger;

cooling the fluid entering the second heat exchanger section below the freezing point of water;

forcing the portion of ambient air past the first and second heat exchanger sections, respectively, where the air exiting the first heat exchanger section is slightly above the freezing point of water and has most of its moisture removed, and the air exiting the second heat exchanger section, which is at the first level of temperature, is below the freezing point of water; and interrupting the circulation of the fluid through at least the second heat exchanger section for a predetermined interval of time on a periodic basic to enable the forced portion of ambient air to defrost the second heat exchanger section.

3. The method of claim 1 in which the step of reducing the temperature of the portion of the ambient air sufficiently to lower the second level of temperature below the freezing point of water includes the step of:

providing a heat exchanger having first and second sections of coiled tubing;

connecting the first and second heat exchanger sections to provide fluid flow from an inlet of the second section to an outlet of the first section;

providing a compressible fluid within the heat exchanger tubing;

compressing the fluid exiting the first heat exchanger section;

condensing the compressed fluid into a liquid;

expanding the liquid as it flows into the inlet of the second heat exchanger section;

forcing the portion of ambient air past the first and second heat exchanger sections, where the air exiting the first heat exchanger section is slightly above the freezing point of water and has most of its moisture removed, and the air exiting the second heat exchanger section, which is at the first level of temperature is below the freezing point of water; and circulating the compressed, but not condensed or expanded, fluid through at least the second heat exchanger section for a predetermined interval of time on a periodic basis to enable the compressed fluid to defrost the second heat exchanger section.

4. The method of claim 1 in which the step of reducing the temperature of the portion of the ambient air sufficiently to lower the second level of temperature below the freezing point of water includes the steps of:

providing a heat exchanger formed of first and second sections of coiled tubing, each section having an inlet and outlet;

providing a compressible first fluid circulating through the second heat exchanger section;

compressing the first fluid which exits the second heat exchanger;

condensing the compressed fluid into a liquid;

expanding the liquid as it flow into the inlet of the second heat exchanger section;

circulating a second fluid through the first heat exchanger section;

cooling the second fluid entering the first heat exchanger section;

forcing the portion of ambient air past the first and second heat exchanger sections, respectively, where the air exiting the first heat exchanger section is slightly above the freezing point of water and has most of its moisture removed, and the air exiting the second heat exchanger section, which is at the first level of temperature is below the freezing point of water; and circulating the compressed, but not condensed or expanded, first fluid through the second heat exchanger section for a predetermined interval of time on a periodic basis to able the compressed first fluid to defrost the second heat exchanger section.

5. A cooling system for maintaining, for a prescribed cabin heat flow rate, the temperature in the interior of the passenger cabin of a parked aircraft at approximately 75° F., where the aircraft has an external air inlet for the introduction of cooling air into ductwork communicating with the cabin, comprising:

electrically-powered, vapor-compression cycle cooling means located external to the airplane for reducing the temperature of a portion of the ambient air external to the aircraft to a first level of temperature which is at least 5° F. below the freezing point of water; and transport means for providing to the aircraft external air inlet at a second level of temperature which is below the freezing point of water the air cooled by the cooling apparatus at a cooling air flow rate established by an electric motor driven blower whose power requirement is more than 10 percent of the power required by the cooling apparatus and which compresses the air cooled by the cooling apparatus to a pressure of at least 13 inches of water, where the cooling air flow rate is such that the ratio of the cabin heat flow rate, in units of BTUs per hour, to the cooling air flow rate, in units of pound per minute, is greater than 600.

6. In a method of maintaining, for a prescribed cabin heat flow rate, the temperature is the interior of the passenger cabin of a parked aircraft at approximately 75° F., where the aircraft has an external air inlet for the introduction of cooling air into ductwork communicating with the cabin, the method including the steps of:

reducing the temperature of a portion of the ambient air external to the aircraft to a first level of temperature using electrically-powered vapor-compression cycle cooling apparatus located external to the airplane; and providing to the aircraft external air inlet at a second level of temperature which is above the freezing point of water and is at least 5° F. higher than the first level of temperature the air cooled by the cooling apparatus at a cooling air flow rate established by an electric motor driven blower which compresses the air cooled by the cooling apparatus where the cooling air flow rate is such that the ratio of the cabin heat flow rate, in units of BTUs per hour, to the cooling air flow rate, in units of pounds per minute, is less than 450, and the power (P) required by the electric motor driven blower is more than 30 percent of the power required by the cooling apparatus, the improvement comprising:

the steps of reducing the temperature of the portion of the ambient air sufficiently to lower the second level of temperature below the freezing point of water; and the step of providing the cooling air at an air flow rate such that the ratio of the cabin heat flow rate, in units of BTUs per hour, to the cooling air flow rate, in units of pounds per minute, is greater than 600, and where the power ($P_1$) consumed by the electric motor driven blower in the improvement is less than one-half (P).

7. In cooling system for maintaining, for a prescribed cabin heat flow rate, the temperature in the interior of the passenger cabin of a parked aircraft at approximately 75° F., where the aircraft has an external air inlet for the introduction of cooling air into ductwork communicating with the cabin, the method including the system including:

electrically-powered vapor-compression cycle cooling means located external to the airplane for reducing the temperature of a portion of the ambient air external to the aircraft to a first level of temperature; and transport means for providing to the aircraft external air inlet at a second level of temperature which is above the freezing point of water and is at least 5° F. higher than the first level of temperature the air cooled by the cooling apparatus at a cooling air flow rate establishhed by an electric motor driven blower which compresses the air cooled by the cooling means, where the cooling air flow rate is such that the ratio of the cabin heat flow rate, in units of BTUs per hour, to the cooling air flow rate, in units of pounds per minute, is less than 450, and the power (P) required by the electric motor driven blower is more than 30 percent of the power required by the cooling apparatus, the improvement comprising:

reducing the temperature of the portion of the ambient air sufficiently to lower the second level of temperature below the freezing point of water; and , providing the cooling air at an air flow rate such that the ratio of the cabin heat flow rate, in units of BTUs per hour, to the cooling air flow rate, in units of pounds per minute, is greater than 600, and where the power ($P_1$) consumed by the electric motor driven blower in the improvement is less than one-half (P).

8. A cooling system for maintaining, for a prescribed cabin heat flow rate of about 100,000 BTUs per hour, the temperature in the interior of the passenger cabin of a parked narrow-body jet aircraft at approximately 75° F., where the aircraft gas an external air inlet for the introduction of cooling air into ductwork communicating with the cabin, comprising:

electrically-powered, vapor-compression cycle cooling means located external to the airplane for reducing the temperature of a portion of the ambient air external to the aircraft to a first level of temperature which is at least 5° F. below the freezing point of water; and transport means for providing to the aircraft external air inlet at a second level of temperature which is below the freezing point of water the air cooled by the cooling apparatus at a cooling air flow rate established by an electric motor driven blower whose power whose requirement is more than 10 percent of the power required by the cooling apparatus and which compresses the air cooled by the cooling apparatus to a pressure of at least 13 inches of water, where the cooling air flow rate is such that the ratio of the cabin heat flow rate, in units of BTUs per hour, to the cooling air flow rate, in units of pounds per minute, is greater than 600, and where the power required to operate the electric motor driven blower is such that the ratio of the cabin heat flow rate, in units of BTUs per hour, to the blower power requirement, in kilowatts, is greater than 7500.

9. A cooling system for maintaining, for a prescribed cabin heat flow rate of about 300,000 BTUs per hour, the temperature in the interior of the passenger cabin of a parked wide-body jet aircraft at approximately 75° F., where the aircraft has an external air inlet for the introduction of cooling air into ductwork communicating with the cabin, comprising:

electrically-powered, vapor-compression cylce cooling means located external to the airplane for reducing the temperature of a portion of the ambient air external to the aircraft to a first level of temperature which is at least 5° F. below the freezing point of water; and transport means for providing to the aircraft external air inlet at a second level of temperature which is below the freezing point of water the air cooled by the cooling apparatus at a cooling air flow rate established by an electric motor driven blower whose power requirement is more than 10 percent of the power required by the cooling apparatus and which compresses the air cooled by the cooling apparatus to a pressure of at least 40 inches of water, where the cooling air flow rate is such that the ratio of the cabin heat flow rate, in units of BTUs per hour, to the cooling air flow rate, in units of pounds per minute, is greater than 600, and where the power required to operate the electric motor driven blower is such that the ratio of the cabin heat flow rate, in units of BTUs per hour, to the blower power requirement, in kilowatts is greater than 400.

10. A method for maintaining the temperature and the humidity of the passenger cabin of a parked aircraft at a level comforable to passengers while the aircraft is parked, said aircraft having an external air inlet for introducing cooling air into air ductway communicating with said passenger cabin, comprising the steps of:
  (a) reducing the temperature of air derived from outside said aircraft to a temperature which is near, but above the freezing point of water, thus condensing a substantial quantity of water from said air, using cooling means located external to said aircraft;
  (b) cooling the cooled air from step (a) further to a temperature which is below the freezing point of water, thus removing a substantial quantity of the remaining water in said air, using cooling means external to said aircraft; and
  (c) delivering the cooled air from step (b) through air transport means to said air inlet and through said air ductways to said passenger cabin for a time sufficient to reach and maintain said comfotable level and to remove heat from said air transport means and said passenger cabin combined at a rate of more than 10 BTU per pound of delivered air.

11. The method of claim 10 further comprising: in step (a), using first fluid-to-air heat exchanger means connected to source of chilled heat transfer fluid; and in step (c), using second fluid-to-air heat exchanger means connected to a source of chilled heat transfer fluid, and periodically interrupting the flow of chilled heat transfer fluid through said second heat exchanger means in order to melt ice accumulations.

12. The method of claim 10 wherein said comfortable level includes maintaining the temperature and humidity in said passenger cabin within the ASHRAE-defined personal comfort zone.

13. The method of claim 10 wherein said cooling and said delivering steps are effected by means adapted to be mounted on an aircraft passenger-loading bridge.

14. The method of claim 10 wherein the temperature of the air delivered to said aircraft is below the freezing point of water.

15. The method of claim 10 wherein said comfortable level in said passenger cabin includes a temperature of about 75° F.

16. The method of claim 10 further comprising providing a fluid-to-air heat exchanger having first and second sections for fluid flow; circulating a cooling fluid through said section so that air exiting said first section is at a temperature near, but above the freezing point of water, and substantially no ice is formed; separating the water produced by cooling of air in said first section; circulating cooling fluid through said second section so that air exiting said second is at a temperature below the freezing point of water; and periodically interrupting the circulation of cooling fluid to permit defrosting of said second section.

17. The method of claim 16 wherein said first and second sections are series-connected for said cooling fluid and for air.

18. The method of claim 11 or claim 16 or claim 17 wherein the velocity of air flow through the first section of said fluid-to-air exchanger is sufficiently low to permit substantially all the water removed from air passing through said first section to separate from said air before said air reaches said second section of said heat exchanger.

19. The method of claim 11 or claim 16 or claim 17 wherein the velocity of air flow in said second section of said heat exchanger is sufficiently low to permit substantially all the water removed from air passing through said second section to separate from said before said air exits said second section.

20. The method of claim 10 wherein the period of said interrupting is in the range of about 2 to about 20 minutes.

21. The method of claim 11 or claim 16 or claim 17 wherein said cooling fluid enters said first section near its cold air exit from said section, and leaves said first section near its warm air entry.

22. The method of claim 11 or claim 13 or claim 15 or claim 17 further comprising carrying out said delivering of cooled air at a rate sufficiently low to minimize noise in said passenger cabin caused by air passing through said air ductways into said passenger cabin.

23. The method of claim 10 further comprising usisng fluid-to-air heat exchanger means connected to a source of chilled heat transfer fluid for effecting said cooling in steps (a) and (b).

24. The method of claim 23 wherein said fluid-to-air heat exchanger means comprises first and second sections wherein said cooling step (a) takes place in a first section of said heat exchanger means, and said cooling step (b) takes place in a second section of said heat exchanger means, and wherein said method further comprises periodically interrupting circulation of cooling fluid through at least said second section to permit defrosting of said second section.

25. The method of claim 10 wherein said cooling and said delivering steps are effected by means adapted to be mounted on an aircraft passenger-loading bridge.

26. The method of claim 10 or claim 11 or claim 12 or claim 13 or claim 14 or claim 15 or claim 16 or claim17 wherein said cooling means comprises vapor-compression cycle cooling means.

27. A method for maintaining the temperature and the humidity of the passenger cabin of a parked aircraft at a level comfortable to passengers while the aircraft is parked, said aircraft having an external air inlet for introducing cooling air into air ductways communicating with said passenger cabin, comprising the steps of:
  (a) reducing the temperature of air derived from outside aircraft to a temperature which is near, but above the freezing point of water, thus condensing a substantial quantity of water from said air, using cooling means located external to said aircraft;
  (b) cooling the cooled air from step(a) further with a heat transfer fluid whose temperature is below the freezing point of water to remove a substantial additional quantity of water from said air, using cooling means external to said aircraft; and
  (c) delivering the cooled air from step (b) through air transport means to said air inlet and through said air ductways to said passenger cabin for a time sufficient to reach and maintain said comfortable level and to remove heat from said air transport means and said passenger cabin combined at a rate of more than 10 BTU per pound of air delivered.

28. The method of claim 27 further comprising: in step (a), using first fluid-to-air heat exchanger means connected to a source of chilled heat transfer fluid; and in step (c), using second fluid-to-air heat exchanger means connected to a source of chilled heat transfer fluid, and periodically interrupting the flow of chilled heat transfer fluid through said heat exchanger means in order to melt ice accumulations.

29. The method of claim 27 wherein said comfortable level includes maintaining the temperature and humidity in said passenger cabin within the ASHRAE-defined personal comfort zone.

30. The method of claim 27 wherein said cooling and said delivering steps are effected by means adapted to be mounted on an aircraft passenger-loading bridge.

31. The method of claim 27 wherein the temperature of the air delivered to said aircraft is below the freezing point of water.

32. The method of claim 27 wherein said comfortable level in said passenger cabin includes a temperature of about 75° F.

33. The method of claim 27 further comprising providing a fluid-to-air heat exchanger having first and second sections for fluid flow; circulating a cooling fluid through said first section so that air exiting said first section is at a temperature near, but above the freezing point of water, and substantially no ice is formed; separating the water produces by the cooling of air in said first section; circulating cooling fluid through said second section so that frost forms on said second section; and periodically interrupting the circulation of cooling fluid through at least said second section to permit defrosting of said second section.

34. The method of claim 27 wherein said first and second sections are series-connected for said cooling fluid and for air.

35. The method of claim 28 or claim 33 or claim 34 wherein the velocity of air flow through the first section of said fluid-to-air exchanger is sufficiently low to permit substantially all the water removed from air passing through said first section to separate from said air before said air reaches said second of said heat exchanger.

36. The method of claim 38 or claim 33 or claim 34 wherein the velocity of air flow in said second section of said heat exchanger is sufficiently low to permit sunstantially all the water removed from air passing through said second section to separate from said air before said air exits said second section.

37. The method of claim 27 wherin the period of said interrupting is in the range of about 2 to about 20 mintues.

38. The method of claim 28 or claim 33 or claim 34 wherein said cooling fluid enters said first section thermally near its cood air exit from said first section, and leaves said first section thermally near its warm air entry.

39. The method of claim 28 or claim 30 or claim 32 or claim 33 further comprising carrying out said delivering of cooled air at a rate sufficiently low to minimize noise in said passenger cabin caused by air passing through said air ductways into said passenger cabin.

40. The method of claim 27 further comprising using fluid-to-air heat exchanger means connected to a source of chilled heat transfer fluid for effecting said cooling in steps (a) and (b).

41. The method of claim 40 wherein said fluid-to-air heat exchanger means comprises first and second sections wherein said cooling step (a) place in a first section of said exchanger means, and said cooling step (b) takes place in a second section of said heat exchanger means, and wherein said method further comprises periodically interrupting circulation of cooling fluid through at least said second section to permit defrosting of said second section.

42. The method of claim 27 wherein said cooling and said deliveing steps are effected by means adapted to be mounted on an aircraft passenger-loading bridge.

43. A system for maintaining the temperature of the passenger cabin of a parked aircraft at a level comfortable to passengers while said aircraft is parked, said aircraft having external air inlet means and air ductways means communicating with said passenger cabin, said system comprising:
   (a) first fluid-to-air heat exchanger means and associated control means for cooling air derived from outside said aircraft to a temperature which is near, but above the freezing point of water, using chilled heat transfer fluid to absorb heat from the air;
   (b) means for removing water condensing from said air in said first heat exchanger means;
   (c) second fluid-to-air heat exchanger means and associated control means for cooling further the same air using chilled heat transfer fluid at a temperature sufficiently low to form ice on the surface of said second heat exchanger means;
   (d) means for periodically interrupting the flow of chilled heat transfer fluid through said second heat exchanger to permit ice accumulations to melt;
   (e) means for removing water formed during said periodic interruptions of flow; and
   (f) means for delivering cool air through air delivery means, said air inlet, and said air ductway means to said passenger cabin in amounts sufficient to remove heat from said air transport means and said passenger cabin combined at a rate of more than 10 BTU per pound of air and to reach and to maintain said comfortable level.

44. The system of claim 43 further comprising vapor compression cycle cooling means for reducing the temprature of said cooling fluid to a temperature substantially lower than the freezing point of water, and means for delivering said cooling fluid to said first and second fluid-to-air heat exchangers.

45. The system of claim 43 wherein said first and said second heat exchanger means, and said cool air delivery means are mounted on an aircraft passenger-loading bridge adjacent to said parked aircraft.

46. The system of claim 43 wherein said control means for said first and second fluid-to-air heat exchanger means maintain the exit air temperature at the desired level and wherein said blower drives air through both said first and second heat exchanger means and into said parked aircraft through said external air inlet.

47. The system of claim 43 wherein said first and said second fluid-to-air heat exchangers are tube and fin heat exchangers.

48. The system of claim 43 wherein said cooling system is ground-installed.

49. The system of claim 43 wherein said delivering means delivers cool air to said passenger cabin at a rate sufficiently low to minimize noise in said passenger cabin caused by the flow of cool air through said air ductway means.

50. A system for maintaining the temperature of the passenger cabin of a parked aircraft at a level comfortable to passengers while said aircraft is parked, said aircraft having external air inlet means and air ductway means communicating with said passenger cabin, said system comprising:

(a) first fluid-to-air heat exchanger means and associated control means for cooling air derived from outside said aircraft to a temperature which is near, but above the freezing point of water, using chilled heat transfer fluid to absorb heat from the air;

(b) means for removing water condensing from said air in said first heat exchanger means;

(c) second fluid-to-air heat exchanger means and associated control means for cooling further the same air throughput to a temperature which is below the freezing point of water, using chilled heat transfer fluid to remove heat from said air;

(d) means for periodically interrupting the flow of chilled heat transfer fluid through said second heat exchanger to permit ice accumulations to melt;

(e) means for removing water formed during said periodic interruptions of cooling fluid; and (f) means for delivering cool air through air delivery means, said air inlet, and said air ductway means to said passenger cabin in amounts sufficient to remove heat from said air transport means and said passenger cabin combined at a rate of more than 10 BTU per pound of air and to reach and to maintain said comfortable level.

51. The system of claim 50 further comprising vapor compression cycle cooling means for reducing the temperature of said cooling fluid to a temperature substantially lower than the freezing point of water, and means for delivering said cooling fluid to said first and second fluid-to-air heat exchangers.

52. The system of claim 50 wherein said first and said second heat exchanger means, and said cool air delivery means are mounted on an aircraft passenger-loading bridger adjacent to said parked aircraft.

53. The system of claim 50 wherein said control means for said first and second fluid-to-air heat exchanger means maintain the exit air temperature at the desired level and wherein said blower drives air through both said first and second heat exchanger means and into said parked aircraft through said external air inlet.

54. The system of claim 50 wherein said first and said second fluid-to-air heat exchangers are tube and fin heat exchangers.

55. The system of claim 50 wherein said cooling system is ground-installed.

56. The system of claim 50 wherein said delivering means delivers cool air to said passenger cabin at a rate sufficiently low to minimize noise in said passenger cabin caused by the flow of cool air through said air ductway means.

57. A method for maintaining the temperature and the humidity of the passenger cabin of a parked aircraft at a level comfortable to passengers while the aircraft is parked, said aircrafting having an external air inlet for introducing cooling air into air ductways communicating with said passenger cabin, comprising the steps of:

(a) cooling the temperature of air derived from outside said aircraft with heat transfer fluid having a temperature below the freezing point of water, using cooling means located external to said aircraft, thus removing a substantial quantity of water from said air; and (b) delivering, for a time sufficient to reach and maintain said comfortable level, the cooled air from step (a) through air transport means to said air inlet and through said air ductways to said passenger cabin to remove heat from said air transport means and said passenger cabin combined at a rate of more than 10 BTU per pound of air delivered.

58. The method of claim 57 wherein said comfortable level includes maintaining the temperature and humidity in said passenger cabin within the ASHRAE-defined personal comfort zone.

59. The method of claim 57 wherein said cooling and said delivering steps are effected by means adapted to be mounted on an aircraft passenger-loading bridge.

60. The method of claim 57 wherein the temperature of the air delivered to said aircraft is either above or below the freezing point of water.

61. The method of claim 57 wherein said comfortable level in said passenger cabin includes a temperature of about 75° F.

62. The method of claim 57 further comprising using vapor compression cycle cooling means as said cooling means.

63. The method of claim 57 further comprising carrying out said delivering of cooled air at a rate sufficiently low to minimize noise in said passenger cabin caused by air passing through said air ductways into said passenger cabin.

64. A method for maintaining the temperature and the humidity of the passenger cabin of a parked aircraft at a level comfortable to passengers while the aircraft is parked, said aircraft having an external air inlet for introducing cooling air into air ductways communicating with said passenger cabin, comprising th step of:

(a) cooling the temperature of air derived from outside said aircraft to a temperature which is below the freezing point of water, using cooling means located external to said aircraft, thus removing a substantial quantity of water from said air; and (b) delivering, for a time sufficient to reach and maintain said comfortable level, the cool air from step (a) through air transport means to said air inlet and through said air ductways to said passenger cabin to remove heat from said air transport means and said passenger cabin combined at a rate of more than 10 BTU per pound of air delivered.

65. The method of claim 64 wherein said comfortable level includes maintaining the temperature and humidity in said passenger cabin within the ASHRAE-defined personal comfort zone.

66. The method of claim 64 wherein said cooling and said delivering steps are effected by means adapted to be mounted on an aircraft passenger-loading bridge.

67. The method of claim 64 wherein the temeprature of the air delivered to said aircraft is either above or below the freezing point of water.

68. The method of claim 64 wherein said comfortable level in said passenger cabin includes a temperature of abaout 75° F.

69. The method of claim 64 further comprising using vapor compression cycle cooling means as said cooling means.

70. The method of claim 64 further comprising carrying out said delivering of cooled air at a rate sufficiently low to minimize noise in said passenger cabin caused by air passing through said air ductways into said passenger cabin.

71. A system for maintaining the temperature of the passenger cabin of a parked aircraft at a level comfortable to passengers while said aircraft is parked, said aircraft having external air inlet means and air ductway means communicating with said passenger cabin, said system comprising:

(a) fluid-to-air heat exchanger means and associated control means for cooling air from outside said aircraft with a heat transfer fluid having a temperature which is below the freezing point of water and for removing a substantial quantity of water from said air; and (b) means for delivering the cooled, dry air through air delivery means, said air inlet, and said air ductway means to said passenger cabin for a time sufficient to reach and maintain said comfortable level and to remove heat from said transport means in said passenger cabin combined at a rate of more than 10 BTU per pound of delivered air.

72. The system of claim 71 further comprising vapor compression cycle cooling means for reducing the temperature of said cooling fluid to a temperature which is below the freezing point of water.

73. The system of claim 71 wherein said fluid-to-air heat exchanger means and said air delivery means are mounted on an aircraft passenger-loading bridge adjacent to said parked aircraft.

74. The system of claim 71 wherein said cooling system is ground-installed.

75. The system of claim 71 wherein said delivering means delivers cool air to said passenger cabin at a rate sufficiently low to minimize noise in said passenger cabin.

76. A system for maintaining the temperature of the passenger cabin of a parked aircraft at a level comfortable to passengers while said aircraft is parked, said aircraft having external air inlet means and air ductway means communicating with said passenger cabin, said system comprising:

(a) fluid-to-air heat exchanger means and associated control means for cooling air from outside said aircraft to a temperature which is below the freezing point of water and for removing a substantial quantity of water from said air; and (b) means for delivery the cooled, dry air through air delivery means, said air inlet, and said air ductway means to said passenger cabin for a time sufficient to reach and maintain said comfortable level and to remove heat from said transport means in said passenger cabin combined at a rate of more than 10 BTU per pound of delivered air.

77. The system of claim 76 further comprising vapor compression cycle cooling means for reducing the temperature of said cooling fluid to a temperature which is below the freezing point water.

78. The system of claim 77 wherein said heat exchanger means and said cool air delivery means are mounted on an aircraft passenger-loading bridge adjacent to said parked aircraft.

79. The system of claim 77 wherein said cooling system is ground-installed.

80. The system of claim 77 wherein said delivering means delivers cool air to said passenger cabin at a rate sufficiently low to minimize noise in said passenger cabin.

* * * * *

UNITED STATES PATENT AND TRADEMARK OFFICE
CERTIFICATE OF CORRECTION

PATENT NO. : 4,835,977

DATED : June 6, 1989

INVENTOR(S) : Richard A. Haglund; Robert E. Tupack; and Thomas C. Crippen

It is certified that error appears in the above-identified patent and that said Letters Patent is hereby corrected as shown below: ON TITLE PAGE:

Column 1, line 75, "Inventors: Richard A. Haglund, Hawthorne; Robert E. Tupack, Hermosa Beach, both of Calif.", should read --Inventors: Richard A. Haglund, Hawthorne; Robert E. Tupack, Hermosa Beach; and Thomas C. Crippen, Placentia, all of Calif.--

Signed and Sealed this

Fourteenth Day of January, 1992

Attest:

HARRY F. MANBECK, JR.

*Attesting Officer*    *Commissioner of Patents and Trademarks*